UNITED STATES PATENT OFFICE.

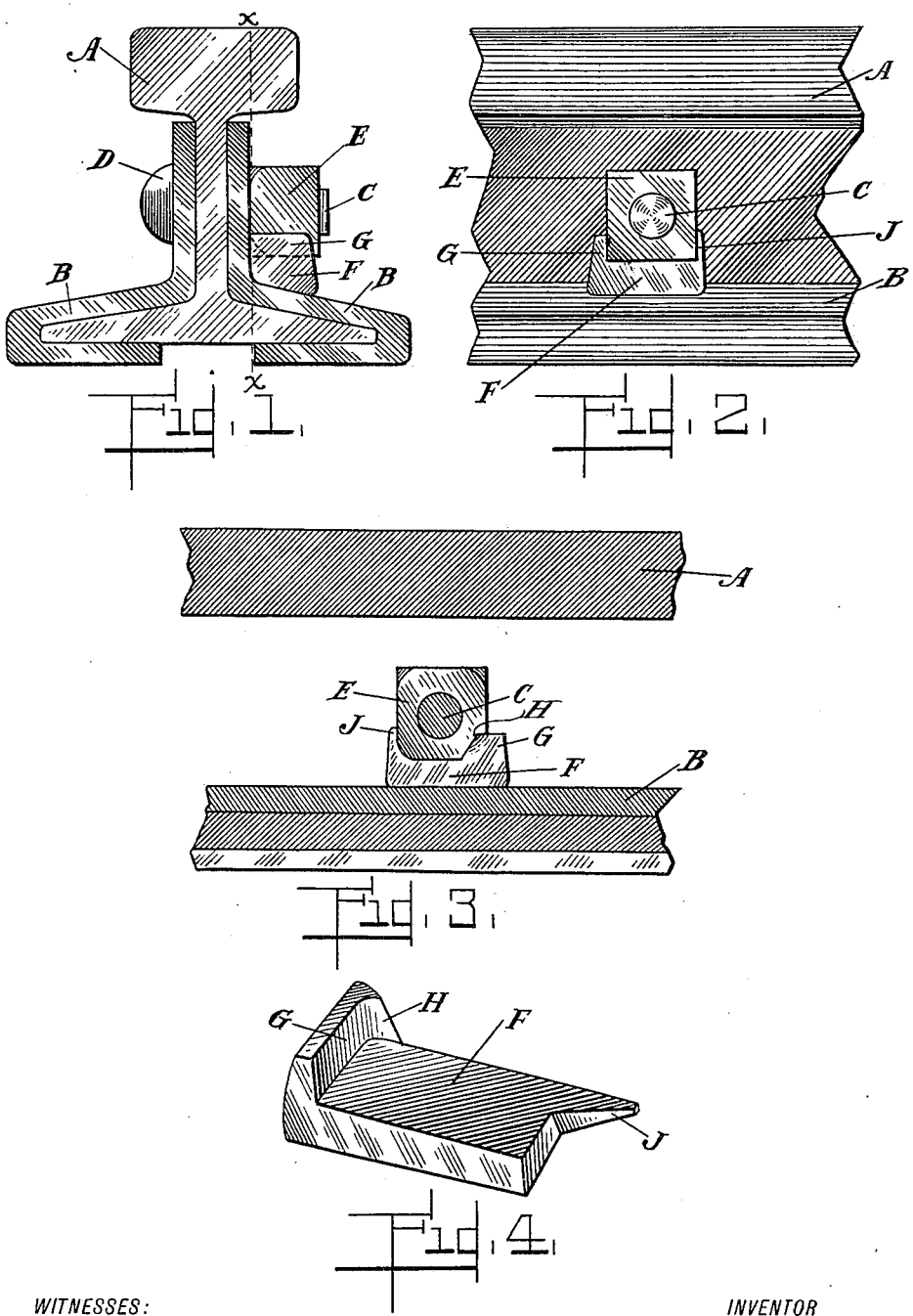

FREDRICK W. ROWE, OF WILBURTON, OKLAHOMA, ASSIGNOR OF ONE-HALF TO E. J. MAHONEY, OF WILBURTON, OKLAHOMA.

NUT-WEDGE.

1,085,225.  Specification of Letters Patent.   Patented Jan. 27, 1914.

Application filed June 28, 1912. Serial No. 706,333.

*To all whom it may concern:*

Be it known that I, FREDRICK W. ROWE, citizen of the United States, residing at Wilburton, in the county of Latimer and State of Oklahoma, have invented certain new and useful Improvements in Nut-Wedges, of which the following is a specification.

My invention relates to new and useful improvements in nut wedges, and relates more particularly to that class of wedges which are employed to lock the nuts carried by the bolts of a rail joint.

The object of the invention is to provide a device that will serve to securely lock the nuts carried by the bolts of a rail joint, and which will accomplish its functions in such a manner as to render the joint practically noiseless during the passage of trains over the same.

The object is further to provide a wedge device for the purpose specified that will be inexpensive, simple and durable in construction, and one that may be applied in its working position with very little expenditure of time or labor.

With these and various other objects in view, my invention has relation to certain novel features of the construction and operation, an example of which is described in the following specification, and illustrated in the accompanying drawing, wherein:

Figure 1 is an end view of a rail joint, in which the herein described wedge device is employed to lock the nuts carried by the bolts of the joint. Fig. 2 is a view of the same in side elevation. Fig. 3 is longitudinal vertical sectional view, taken upon the line X—X of Fig. 1. Fig. 4 is a detail perspective view showing the wedge device separate from the rail joint members with which it is correlated in use.

Referring now more particularly to the drawing, wherein like reference characters designate similar parts in all the figures, the letter A denotes an ordinary rail, which is correlated with a pair of oppositely applied fish plates 3 in the usual and well known manner. A bolt C is transversely passed through the vertical portions of the fish plates and through the web of the rail, said bolt being provided with a semispherical head D, abutting against one of the fish plates, and having a nut E mounted upon its other extremity and screwed tightly against the other fish plate. The nut E will preferably be of the common square type, having the corners of one of the square faces rounded, and this face will be made to contact with the correlated fish plate, instead of being made to face outwardly as is usually the case.

After the nut E has been adjusted into the position shown in the drawing, namely, with two of its opposite edges horizontal, the wedge member F is driven between the lower edge of the nut and the upper surface of the correlated fish plate B. The wedge member F is provided with a head G at one extremity, which will abut against one of the lateral faces of the nut after the wedge has been driven into position. The head G is provided with a slight projecting portion H, which after the wedge has been driven into position, contacts with the adjacent vertical portion of the fish plate B, and fits snugly against one of the lowermost rounded corners of the nut. At the other extremity of the wedge, there is provided a projecting finger J, which is also contiguous with the vertical portion of the correlated fish plate B, after the wedge member has been driven into place. During the process of driving the wedge into place, the finger J occupies the position shown in Fig. 4 projecting in the same plane as that occupied by the wedge. After the wedge is in its proper position, however, the finger J is bent upwardly at a right angle to the body of the wedge and is made to bear firmly against the other rounded lower corner of the nut E. The implement employed to bend the finger J upward may be of any construction suitable to accomplish such a purpose. The metal of which the wedge is formed will have sufficient strength and flexibility to permit the finger J being bent upwardly without breaking off. It will thus be seen that after the wedge has been driven beneath the nut, and after the finger J has been bent upwardly, the two lower rounded corners of the nut, which corners are adjacent to the vertical portion of the correlated fish plate B, will be respectively engaged by the portions H and J of the wedge, thus effectually preventing any displacement of the wedge outwardly from the fish plate B. It is also apparent that there is no possibility for the wedge to undergo displacement parallel with the rail, since the head G and the finger J respectively engage opposite lateral surfaces of the nut. That edge of the member F which comes adjacent to the vertical portion of the fish plate B will have a lesser thickness than the outer edge of said member, thus causing the member to conform to the slope of the fish plate and giving it a wedge construction.

The invention is presented as including all such modifications and changes as properly come within the scope of the following claim.

What I claim is:

In a device of the character described, the combination with a rail, of a pair of fish plates correlated with said rail having vertical portions oppositely engaging the web of the rail, a bolt passing through the web of the rail and through the vertical portions of the fish plates, having a head abutting against the vertical portion of one of the fish plates, a nut carried by the threaded extremity of the bolt having a round cornered face abutting against the vertical portion of the other fish plate, and a wedge member driven between the underside of said nut and the fish plate below the same, said wedge having a head adapted to contact with one lateral face of the nut, a portion of said head being introduced between one of the rounded corners of the nut and the vertical face of the fish plate and having a finger adapted to be bent upward against the opposite lateral face of the nut.

In testimony whereof I have signed my name to this specification in the presence of two subscribing witnesses.

FREDRICK W. ROWE.

Witnesses:
BYRON B. BRONSON,
WM. McGURK.

Copies of this patent may be obtained for five cents each, by addressing the "Commissioner of Patents, Washington, D. C."